US011853753B1

(12) United States Patent
Chawda et al.

(10) Patent No.: US 11,853,753 B1
(45) Date of Patent: Dec. 26, 2023

(54) DETECTION, PRESENTATION, AND RESOLUTION OF BOTTLENECKS IN MONOLITH DECOMPOSITION

(71) Applicant: Amazon Technologies, Inc., Seattle, WA (US)

(72) Inventors: Vivek Chawda, Palo Alto, CA (US); Samartha Chandrashekar, Bellevue, WA (US); Sophia Tsang, Newark, CA (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 17/409,448

(22) Filed: Aug. 23, 2021

(51) Int. Cl.
*G06F 9/44* (2018.01)
*G06F 8/77* (2018.01)
*G06F 8/41* (2018.01)
*G06F 11/34* (2006.01)
*G06F 8/72* (2018.01)

(52) U.S. Cl.
CPC ............... *G06F 8/77* (2013.01); *G06F 8/433* (2013.01); *G06F 11/34* (2013.01); *G06F 8/72* (2013.01)

(58) Field of Classification Search
CPC ........................................ G06F 8/77
USPC ........................................ 717/123
See application file for complete search history.

(56) References Cited

U.S. PATENT DOCUMENTS

| | | | |
|---|---|---|---|
| 9,256,472 B2 * | 2/2016 | Kakade | G06F 8/72 |
| 9,665,474 B2 * | 5/2017 | Li | G06F 9/505 |
| 9,740,480 B1 | 8/2017 | Ghouti et al. | |
| 10,116,679 B1 | 10/2018 | Wu et al. | |
| 10,223,104 B2 * | 3/2019 | Rees | G06F 8/71 |
| 10,496,935 B2 * | 12/2019 | Sachdev | H04L 41/145 |
| 10,545,738 B1 * | 1/2020 | Jaeger | G06F 8/427 |
| 10,579,370 B2 * | 3/2020 | Gupta | G06F 8/20 |
| 10,628,152 B2 * | 4/2020 | Chandramouli | G06F 8/65 |
| 10,911,477 B1 | 2/2021 | Kharraz et al. | |
| 10,970,067 B1 * | 4/2021 | Gupta | G06F 8/20 |

(Continued)

OTHER PUBLICATIONS

Non-Final Office Action, U.S. Appl. No. 17/037,075, dated Sep. 21, 2021, 8 pages.

(Continued)

*Primary Examiner* — Francisco J Aponte
(74) *Attorney, Agent, or Firm* — Nicholson De Vos Webster & Elliott LLP

(57) ABSTRACT

Techniques are described for identifying resource bottlenecks in decomposing monolithic software applications as part of software modernization processes. An application modernization system constructs a graph model of a software application based on an analysis of application artifacts associated with the software application. The graph model includes nodes representing independent application components, and further includes edges representing identified dependency relationships among the application components. An application modernization system further generates application profile metrics associated with the identified dependencies, and weights derived from the metrics are applied to the nodes and/or the edges of the graph model to generate a weighted graph model that identifies the resource bottlenecks among the application components and the identified dependency relationships. The weighted graph model is transmitted to a computing device for display to a user.

20 Claims, 9 Drawing Sheets

(56) References Cited

U.S. PATENT DOCUMENTS

| | | | |
|---|---|---|---|
| 11,042,369 B1* | 6/2021 | Kimball | G06F 9/4843 |
| 11,068,245 B2* | 7/2021 | Jaeger | G06F 8/4441 |
| 11,093,216 B2* | 8/2021 | Sasidharan | G06F 8/30 |
| 11,106,757 B1 | 8/2021 | Curzi et al. | |
| 11,157,249 B1* | 10/2021 | Rapson | G06F 8/433 |
| 11,194,558 B2* | 12/2021 | Rihani | G06F 8/64 |
| 11,354,120 B1* | 6/2022 | Zhang | G06F 8/72 |
| 11,385,892 B1* | 7/2022 | Zhang | G06F 16/9535 |
| 11,422,797 B1* | 8/2022 | Zhang | G06F 8/72 |
| 11,467,828 B1* | 10/2022 | Zhang | H04L 67/34 |
| 11,544,046 B1* | 1/2023 | Zhang | G06F 8/427 |
| 2008/0184209 A1 | 7/2008 | LaFrance-Linden | |
| 2012/0137240 A1 | 5/2012 | Krueger | |
| 2012/0265507 A1 | 10/2012 | Carbajales et al. | |
| 2014/0123108 A1 | 5/2014 | Cheluvaraju et al. | |
| 2015/0370763 A1 | 12/2015 | Wang et al. | |
| 2015/0378697 A1 | 12/2015 | Sathyanathan et al. | |
| 2016/0104176 A1 | 4/2016 | Kama | |
| 2017/0097820 A1 | 4/2017 | Lategan | |
| 2017/0149875 A1 | 5/2017 | Iyengar et al. | |
| 2017/0193437 A1* | 7/2017 | Apte | G06Q 10/087 |
| 2018/0191599 A1* | 7/2018 | Balasubramanian | G06F 9/5072 |
| 2019/0108067 A1* | 4/2019 | Ishikawa | H04L 41/50 |
| 2019/0158420 A1* | 5/2019 | Soni | G06F 11/3003 |
| 2019/0253485 A1 | 8/2019 | Jyoti Banerjee | |
| 2020/0249997 A1* | 8/2020 | Ough | G06F 9/5027 |
| 2020/0401386 A1* | 12/2020 | Punathil | G06F 8/433 |
| 2021/0011688 A1* | 1/2021 | Sasidharan | G06F 8/10 |
| 2021/0042141 A1 | 2/2021 | De et al. | |
| 2021/0133318 A1* | 5/2021 | Andrews | G06F 11/3055 |
| 2021/0144517 A1* | 5/2021 | Guim Bernat | H04L 9/0637 |
| 2021/0232390 A1* | 7/2021 | Hwang | H04L 41/16 |
| 2021/0258373 A1 | 8/2021 | Syed et al. | |
| 2021/0334194 A1* | 10/2021 | Xiao | G06F 11/3466 |
| 2022/0006706 A1* | 1/2022 | Patodia | H04L 41/5019 |
| 2022/0035668 A1* | 2/2022 | de Capoa | G06F 11/302 |
| 2022/0138617 A1* | 5/2022 | Xiao | G06F 9/45558 706/12 |
| 2022/0318060 A1* | 10/2022 | Choochotkaew | G06F 9/5005 |
| 2022/0342990 A1 | 10/2022 | Zhang et al. | |
| 2022/0365812 A1* | 11/2022 | Paranthaman | G06F 8/70 |
| 2023/0019920 A1* | 1/2023 | Inagaki | G06F 9/46 |

OTHER PUBLICATIONS

Jiangtao Zhang et al., Unpublished U.S. Appl. No. 17/109,359, filed Dec. 2, 2020, entitled "Power Supply Shedding for Power Efficiency Optimization", 45 pages.

Jiangtao Zhang, Unpublished U.S. Appl. No. 17/037,075, filed Sep. 29, 2020, entitled "Optimal Software Architecture Recommendations By An Application Modernization Service", 45 pages.

Chen, R. et al., "From Monolith to Microservices: A Dataflow-Driven Approach," 2017 24th Asia-Pacific Software Engineering Conference (APSEC), 2017, pp. 466-475.

Gulati, V. et al., "Introducing IBM Mono2Micro," IBM Cloud Blog, May 6, 2020, https://web.archive.org/web/20201109163249/https://www.ibm.com/cloud/blog/announcements/ibm-mono2micro, 7 pages.

Notice of Allowance, U.S. Appl. No. 17/037,075, dated Mar. 11, 2022, 5 pages.

Notice of Allowance, U.S. Appl. No. 17/109,359, dated Dec. 21, 2021, 9 pages.

Notice of Allowance, U.S. Appl. No. 17/109,359, dated May 2, 2022, 8 pages.

Patel, C. et al., "Software Clustering Using Dynamic Analysis and Static Dependencies," Thesis M. Comp. Sc. Concordia University, Aug. 2008, 103 pages.

Xiao, C. et al., "Software Clustering Based on Dynamic Dependencies," Ninth European Conference on Software Maintenance and Reengineering, 2005, pp. 124-133.

Non-Final Office Action, U.S. Appl. No. 17/409,426, dated Nov. 28, 2022, 34 pages.

Notice of Allowance, U.S. Appl. No. 17/409,383, dated Dec. 7, 2022, 9 pages.

Advisory Action, U.S. Appl. No. 17/409,426, dated Apr. 28, 2023, 2 pages.

Final Office Action, U.S. Appl. No. 17/409,426, dated Mar. 17, 2023, 45 pages.

Non-Final Office Action, U.S. Appl. No. 17/409,426, dated Aug. 4, 2023, 55 pages.

* cited by examiner

DETECTION, PRESENTATION, AND RESOLUTION OF BOTTLENECKS IN MONOLITH DECOMPOSITION

BACKGROUND

Modernizing software applications is a common task for business organizations and other entities desiring to improve their information technology (IT) environments in response to changing software application use cases, resource demands, and user access patterns. For example, while many legacy applications were designed for older operating environments with lesser expectations, modern applications now often need the ability to scale quickly to potentially millions of users, have global availability, manage very large amounts of data, and respond to requests in milliseconds. The processes for upgrading, converting, rewriting, etc., such applications to enable improved performance is referred to generally as software modernization. Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various embodiments in accordance with the present disclosure will be described with reference to the drawings, in which.

DETAILED DESCRIPTION

Figure 1:
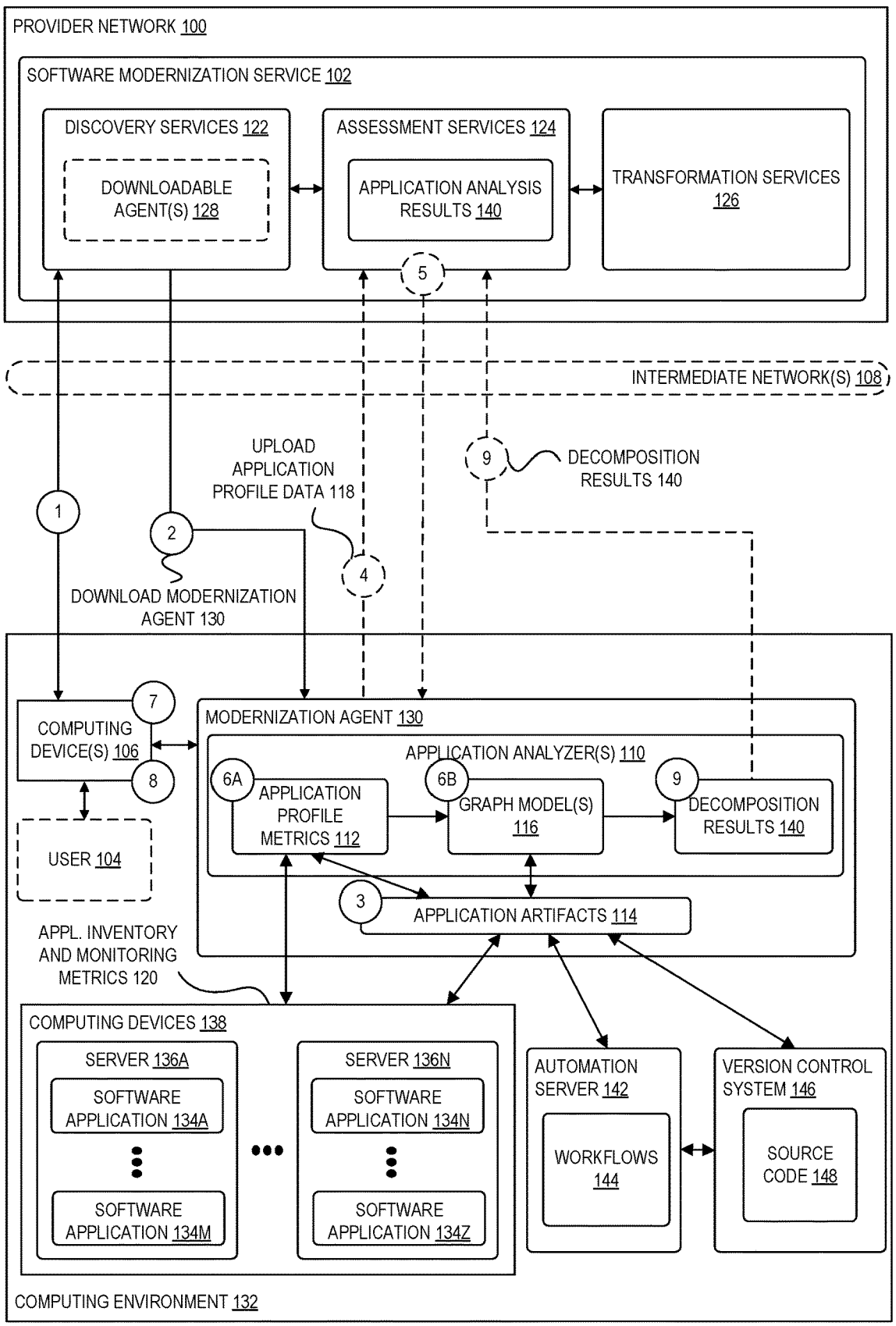
FIG. 1 is a block diagram illustrating an environment for detection, presentation, and resolution of bottlenecks to decompose monolithic software applications as part of software modernization processes according to some embodiments.

The present disclosure relates to methods, apparatus, systems, and non-transitory computer-readable storage media for detection, presentation, and resolution of bottlenecks to decompose monolithic software applications as part of software modernization processes. According to some embodiments, an application modernization system constructs a model (e.g., a graph model) of a software application based on an analysis of application artifacts (e.g., source code, bytecode, intermediate code representations, etc.) associated with the software application. In embodiments in which the model is a graph model, the graph model may include, for example, nodes (may also be referred to as vertices) each representing an independent abstraction or application component (e.g., a package, a file, a class, a group, a namespace, a method, a data object, etc.), and further include edges connecting the nodes and representing identified dependency relationships among the application components. In some embodiments, an application modernization system further generates various application profile metrics associated with the application components and/or the identified dependencies (e.g., runtime profile metrics), and weights derived from such metrics are applied to the nodes and/or the edges of the graph model. In this context, such weights may generally represent amounts of resource usage at the nodes and/or along the edges of the graph model. Among other benefits, the software application graph generation techniques described herein enable more efficient identification and prioritization of bottlenecks as application refactoring candidates for decomposing monolithic software applications into modernized architectures, thereby improving the performance, scalability, and general operation of such applications.

Software modernization broadly refers to converting, rewriting, or porting legacy software applications or systems to more modern computer programming languages, software libraries, protocols, hardware platforms, application architectures, cloud-based services, and the like. Users, business organizations, and other entities often desire to modernize their various software applications and systems to improve operational performance, to increase application availability, to reduce exposure to vulnerabilities (e.g., software crashes, security vulnerabilities, etc.), to migrate applications from non-cloud environments to infrastructure provided by a cloud services provider (e.g., to leverage a cloud service provider's reliable infrastructure, increased performance benefits, etc.), and to enable more efficient ongoing development of the applications, among other possible reasons.

In some cases, modernizing a software application involves refactoring a monolithic software application into smaller subunits, where each subunit includes an independent code base that can be independently maintained and deployed. The decomposition of a monolithic software application into such subunits generates benefits, including an ability to independently scale various components of the application as needed. However, identifying candidate subunits of an application for such refactoring processes presents several challenges. For example, the complex interworking nature of software applications often renders the process of identifying application subunits an intractable problem for software developers desiring to modernize a software application. This process can be further complicated by computing resource bottlenecks, which are components of the application that are associated with high resource usage (e.g., CPU (Central Processing Unit) usage, memory usage, network bandwidth usage, or other usage metrics). These bottlenecks may be difficult to disentangle from the application as a whole, or may present challenges when trying to migrate the application component to a cloud-based deployment (e.g., because the CPU usage for an identified application component exceeds the CPU capacity available for a selected instance type that might be used to implement the identified application component, or because a rate of database calls issued by an identified application component exceeds a rate limit for a cloud-based database, etc.).

The aforementioned challenges, among others, are addressed by an application modernization system that is capable of automatically identifying bottlenecks within a monolithic software application, and presenting information associated with the bottlenecks to a user in a manner that is easy to understand. As used herein, a bottleneck may refer to an application component, or a set of application components (e.g., a dependency relationship between two application components), with high resource usage (e.g., above a threshold). As indicated, in some embodiments the processes described herein include generating a model (e.g., a graph model) of a software application, and weighting the model based on a variety of application profiling metrics, where the metrics may generally provide an indication of an amount of resource usage at the nodes and/or along the edges of the graph model. Bottleneck information can be presented (e.g., displayed on a display) at a class level, group level, package level, namespace level, etc. In non-limiting examples, bottlenecks may be identified and presented as per-class CPU utilization, or a particular API operation with heavy CPU utilization.

FIG. 1 illustrates an environment for detection, presentation, and resolution of bottlenecks to decompose monolithic software applications as part of software modernization processes according to some embodiments. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks can use one or more user accounts that are associated with a customer account, though these terms can be used somewhat interchangeably depending upon the context of use. Users can interact with a provider network across one or more intermediate networks 108 (e.g., the internet) via one or more interface(s) (not shown), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations, such as transferring customer data to and from the customer resources. The control plane components are typically implemented on a separate set of servers from the data plane servers, and control plane traffic and data plane traffic can be sent over separate/distinct networks.

To provide these and other computing resource services, provider networks often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

In some embodiments, the provider network 100 includes a hardware virtualization service. The hardware virtualization service (referred to in various implementations as an elastic compute service, a virtual machines service, a computing cloud service, a compute engine, or a cloud compute service) can enable users of the provider network 100 to provision and manage compute resources, such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to customer instances, but rather are dedicated to instance management tasks, such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, the cloud provider network 100 includes a container service. The container service can be a container orchestration and management service (referred to in various implementations as a container service, cloud container service, container engine, or container cloud service) that allows users of the cloud provider network to instantiate and manage containers. In some embodiments the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

With continued reference to FIG. 1, in some embodiments a software modernization service 102 of the cloud provider network 100 provides various types of software modernization services and functionality, including discovery services 122, assessment services 124, and transformation services 126, which are collectively aimed at helping users to discover and use recommended modernization and migration paths for their software applications. The discovery services 122, for example, provide various services, software applications, software agents, and/or other tools (e.g., including downloadable modernization agents 130) used to identify software applications in users' computing environments, and to collect profile information for software applications undergoing modernization processes. The assessment services 124 generally enable users and applications to obtain various types of software modernization assessments and recommendations, e.g., based on analyses of application artifacts (e.g., source code and/or bytecode) collected for users' applications by the discovery services 122 and associated tools. For example, the recommendations generated by the assessment services 124 can include recommended modernization strategies, recommended modernization tools, estimated modernization costs, etc. In some embodiments, the transformation services 126 generally include various services, applications, and/or other tools used to perform modernization actions and migrations, e.g., based on modernization recommendations generated by the assessment services 124.

According to embodiments described herein, a software modernization system can be used to identify computing resource bottlenecks in connection with decompositions of monolithic software applications undergoing modernization processes. For example, in some embodiments, a modernization agent 130 includes one or more application analyzer(s) 110 configured to statically and/or dynamically analyze application artifacts (e.g., application artifacts 114 including source code, bytecode, and/or other associated artifacts) obtained for software applications undergoing analysis (e.g., any of software applications 134A-134Z running on servers 136A-136N or computing devices 138). In some embodiments, the source code or bytecode files may be obtained from a version control system 146, an automation server 142, and/or other storage locations within or external to a user's computing environment 132.

In some embodiments, based on various types of analyses performed, the application analyzer(s) 110 generate application profiling metrics 112 and models (e.g., graph model(s) 116) representing resource usage by application components (e.g., packages, files, classes, methods, variables, etc.) and/or dependency relationships among application components, among other possible information. According to embodiments, the generation of such graph model(s) 116 further involves applying weights derived from the generated application profiling metrics 112 to the nodes and/or the edges of the graph model 116 to obtain weighted graph models. As indicated, these weights can be representative of amounts of resource usage at the nodes and/or along the edges of the graph model. In some embodiments, the weighted graph model can then be used to generate decomposition results 140 used to recommend to a user a proposed decomposition strategy that can be used as a guide to modernize the application undergoing analysis. For example, the decomposition results 140 can include one or more distinct microservices broken out from the application.

In FIG. 1, the circles labeled "1"-"8" illustrate an example process in which a user obtains a modernization agent 130 used to inventory and analyze software applications in the user's computing environment 132 including, e.g., processes related to decomposing a monolithic software application into subcomponents (sometimes also referred to as subunits or microunits). Each subunit represents a defined subset of a software application's source code that, with some amount of refactoring, can be implemented as an independently developed, buildable, deployable, and scalable software application unit. For example, in a microservices architecture, an application is arranged as a collection of smaller subunits ("microservices") that can be deployed and scaled independently from one another, and which can communicate with one another over a network. These microservices may be fine-grained, in that they have specific technical and functional granularity, and may implement lightweight communications protocols. The microservices of an application can perform different functions from one another, can be independently deployable, and may use different programming languages, databases, and/or hardware/software environments from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, a container, and/or a serverless function, in some examples.

In some embodiments, at circle "1" in FIG. 1, a user accesses the software modernization service 102 (e.g., via various interfaces provided by the discovery services 122) to obtain information about available modernization services and/or tools, and to download one or more downloadable agents 128. In some embodiments, at circle "2," one or more modernization agents 130 are downloaded and installed on servers within the user's on-premises computing environment 132 (e.g., on a physical server or virtual machine (VM)). In some embodiments, one or more users (e.g., a user 104) use one or more computing devices 106 to interact with the modernization agent 130 via a command line interface (CLI), a graphical user interface (GUI), or any other type of interface provided by the modernization agent 130.

For example, at circle "2" in FIG. 1, the user 104 has obtained and installed the modernization agent 130, including the application analyzer(s) 110, on the computing device 106 within the user's computing environment 132 (e.g., at an on-premises datacenter or other type of user computing environment) to assist with modernizing one or more software applications 134A-134Z running in the user's computing environment 132. The software applications 134A-134Z may include, for example, one or more applications deployed on one or more Linux-based or Windows-based hosts, and generally represent any type of software that may be executing in a computing environment (e.g., software implementing a web application or service, business application software, etc.). Each of the software applications can be a single process or a group of interoperating processes, and may execute within a virtualized or non-virtualized execution environment (e.g., the Java virtual machine (JVM) in the case of a Java application, or any other execution environment for other types of applications).

As part of a modernization assessment process, in some embodiments, at circle "3" in FIG. 1, the user 104 invokes an inventory command provided by the modernization agent 130. The inventory command is used to identify applications within the user's computing environment 132 that can be assessed (e.g., including some or all of the software applications 134A-134Z in the example of FIG. 1) and, optionally, to perform various preliminary analyses of the identified applications. In some embodiments, instead of interacting directly with the modernization agent 130, the user 104 may instead interact with a web-based console or other interface provided by the software modernization service 102. The software modernization service 102 may then instruct the modernization agent 130 (and/or another application running in the user computing environment 132) to perform some or all of the application inventory and monitoring metrics collection operations 120 described in reference to FIG. 1. In some embodiments, the application inventory and monitoring metrics collection operations 120 may include, for example, identifying an inventory of applications, and obtaining application artifacts 114 for the applications (e.g., including source code or binary executable file information identifying JAR files, DLL files, process identifiers, etc.), among other possible types of application profile information described herein.

In some embodiments, the modernization agent 130 collects dynamic runtime information about discovered software applications including, e.g., process identifiers, runtime artifacts such as binary executables, JAR files, DLL files, etc. For example, the modernization agent 130 may collect process-level or JVM- or CLR-level metrics (JVM— Java Virtual Machine, CLR—Common Language Runtime).

In another example, a code section may be wrapped with instrumentation hooks that the modernization agent 130 identifies and uses to collect the dynamic runtime information. In some embodiments, the instrumentation hooks may be added to the source code by the customer/user of the software modernization service 102. For example, the customer may use a service such as AWS X-Ray to add the instrumentation hooks to the source code. In another example, the modernization agent 130 may add the instrumentation hooks to the bytecode after decompiling (e.g., using Valgrind).

The modernization agent 130 may further collect source code 148, for example, stored in the version control system 146 and/or other storage location(s) within the user's computing environment 132 or elsewhere. In some embodiments, the user 104 provides the modernization agent 130, the software modernization service 102, or both, with authentication information (e.g., a username and password, security token, etc.) that can be used to access the version control system 146 based on a URL (Uniform Resource Locator) or other access identifier.

In some embodiments, the user 104 may further configure the modernization agent 130 with the ability to access the automation server 142 in the user's computing environment, the provider network 100, or elsewhere, for example to collect bytecode files or other types of application artifacts. In some embodiments, the automation server 142 broadly represents any type of server, service, application, or other tool that helps automate various software development processes such as, for example, building, testing, and deploying software applications. The automation server 142, for example, may automate such processes in an effort to facilitate a continuous integration and continuous delivery approach to software development and deployment. In some embodiments, the automation server 142 is a server-based system that interfaces with version control tools (e.g., the version control system 146) to identify changes to a repository (e.g., code commits) or other events, and may further include configurations used to automate one or more actions responsive to the detection of such events. In some embodiments, users can use the automation server 142 to configure any number of workflows 144 (sometimes also referred to as "jobs," "pipelines," or "projects"), each representing a defined configuration of automated processes for building, testing, and/or deploying software applications (e.g., illustrated by stored workflows 148A-148N). In this example, each workflow may be associated with a configuration file or other data that defines various actions and/or parameters (e.g., locations of source repositories, names of binary executable files to be generated, locations at which to store binary executable files, etc.). In some embodiments, the automation server 142 provides an interface (e.g., a network-accessible API) via which users and applications can request server-related information and perform various actions including, for example, obtaining a list of configured workflows, obtaining configuration information associated with configured workflows, creating new workflows, etc.

In some embodiments, at circle "4" in FIG. 1, the modernization agent 130 optionally uploads application profile data 118 including identifiers of the discovered software applications in the user's computing environment 132. The assessment service 124 may use the uploaded application profile data 118, for example, to create a software application list that associates the identified software applications with a user account associated with the user 104. The software application list, for example, may be displayed to the user 104 in a GUI, or another interface, to provide the user 104 with information about the discovered set of applications in the user's computing environment 132. In other embodiments, the application profile data 118 is stored only locally by the modernization agent 130.

In some embodiments, at circle "5" in FIG. 1, at least one of the assessment service 124 and/or the modernization agent 130 initiates processes, at circles "6A" and "6B," to analyze a software application identified by the modernization agent 130 to identify bottlenecks of the software application, e.g., as part of a process to decompose a monolithic software application. For example, in some embodiments, the software modernization service 102 and/or the modernization agent 130 receives a request to identify one or more bottlenecks of a software application, where each bottleneck represents a component of the software application that is associated with high resource usage (e.g., CPU usage, memory usage, network bandwidth usage, or other usage metrics). In some embodiments, the request to identify one or more bottlenecks of a software application may be received from a user (e.g., from a computing device operated by a user), and in some embodiments the request may be received from a workflow responsible for generating a software application modernization recommendation. In some embodiments, responsive to such requests, one or more of the application analyzer(s) 110 generates one or more application profiling metrics 112, a graph model 116, or both, collectively representing and providing information about the software application being analyzed.

Figure 2:
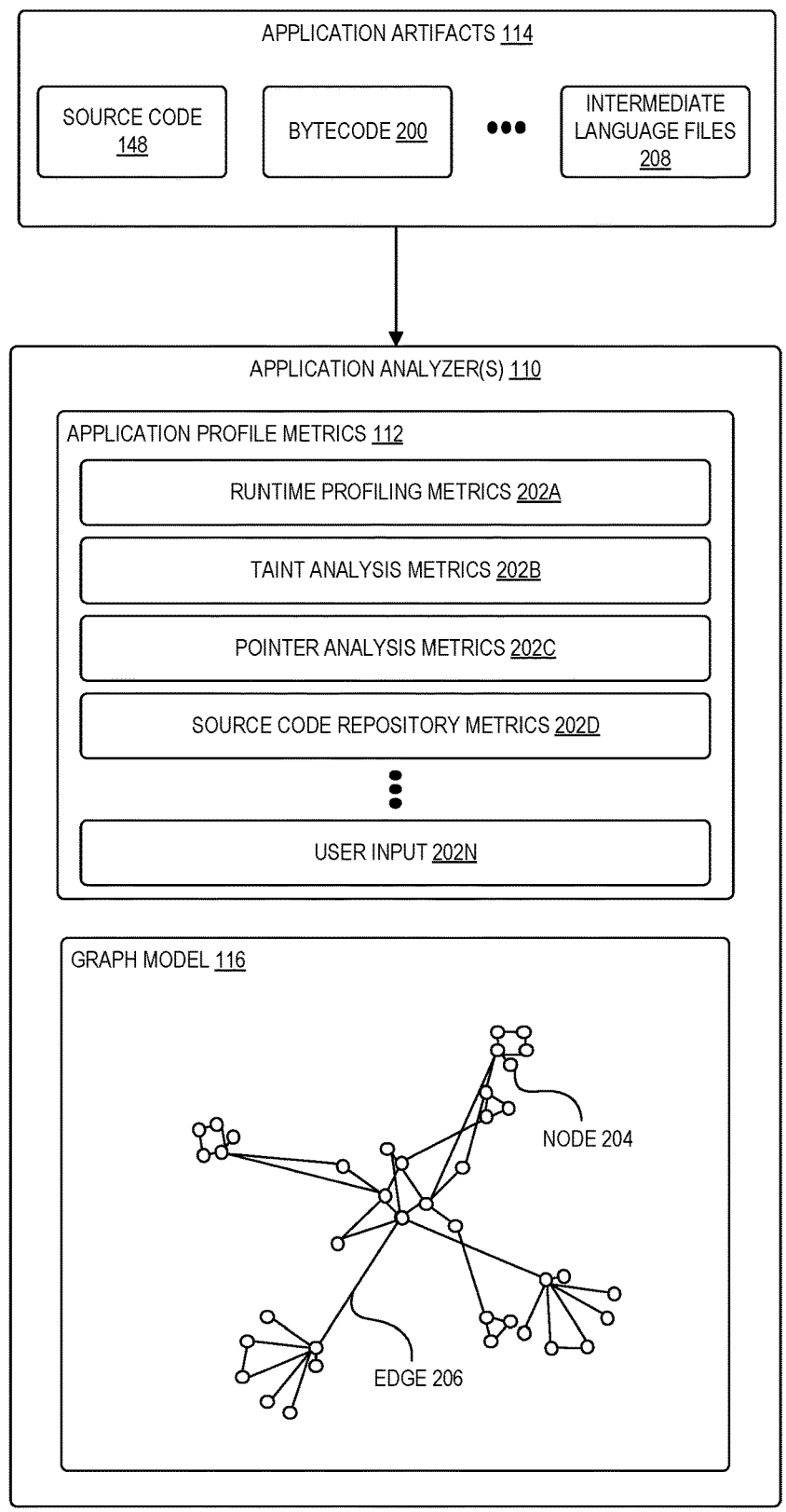
FIG. 2 is a block diagram illustrating example application profile metrics generated by one or more application analyzers and the generation of a graph model representation of a monolithic software application according to some embodiments.

FIG. 2 illustrates the generation of application profiling metrics and a graph-based model of a software application undergoing modernization processes according to some embodiments. In some embodiments, the application artifacts 114, including the source code 148, bytecode 200, intermediate language files 208, and/or combinations thereof, include various application components (e.g., packages, files, classes, groups, namespaces, methods, data objects, etc.) that are provided as input to the application analyzer(s) 110 for analysis of resource usage and/or component dependencies. The resource usages generally can represent any combination of static source code-derived usage, build-time usage, and dynamic runtime usage. Similarly, the component dependencies generally can represent any combination of static source code-derived dependencies (e.g., because of a class referring to another class, or a method in one class referencing a method in a different class), build-time dependencies, and dynamic runtime dependencies.

As indicated, in some embodiments, the application analyzer(s) 110 perform various types of analyses on the software application to obtain any number of separate application profiling metrics 112. These application profiling metrics 112 can include at least one of: runtime profiling metrics 202A, which are representative of at least one of an amount of resources used to process program calls between application components (e.g., CPU usage, memory usage, network bandwidth usage, storage bandwidth usage, number of file handles, number of open TCP (Transmission Control Protocol) handles/connections, level of concurrency, for example by number of threads, or any custom metric), a cardinality of program calls between application components, or a latency of program calls between application components; taint analysis metrics 202B representative of sources of user input into the software application and associated data flows through the software application; pointer analysis metrics 202C representative of application components that refer to a same shared object in memory; dynamic reference metrics representative of application components that refer to a same runtime instance of a data object; source code repository metrics 202D representative of information associated with source code file statistics relative to a version control system (e.g., indicating a frequency of updates to particular files, instances of files being checked into contemporaneously, etc.); or user input 202N specifying information about particular application component dependencies. In some embodiments, the application profiling metrics 112 can be associated with varying types of application abstractions and components, e.g., packages, files, classes, groups, namespaces, methods, or data objects.

In some embodiments, the application analyzer(s) 110 also generate the graph model 116 representing identified dependency relationships among the application components. As shown in FIG. 2, the graph model 116 includes a plurality of nodes (e.g., node 204) each representing an application component of the application components (e.g., a package, a file, a class, a group, a namespace, a method, a data object, etc.) and edges (e.g., edge 206) each representing a dependency relationship between two application components (e.g., indicating that at least one of the application components is dependent on the other component). In some embodiments, a web-based console or standalone application GUI can display a graphical representation of the graph model 116. For example, at circle "7," the modernization agent 130 transmits the graph model(s) 116 to the computing device(s) 106 for display to the user 104 in a GUI on a display. In some embodiments, information contained in, or derived from, the graph model(s) 116 may be displayed in a GUI on a display in a format different from the graph format shown in FIG. 2. For example, information related to the application components and the dependency relationships may be presented in a GUI on a display as a list, a table, a chart, or in any other format.

In some embodiments, the application profiling metrics 112 generated by the application analyzer(s) 110 are applied to the graph model 116 to obtain a weighted graph model providing more information about the nodes and/or the dependency links represented in the graph. For example, FIG. 3 illustrates the application of graph weights derived from application profiling metrics to obtain a weighted graph according to some embodiments.

Figure 3:
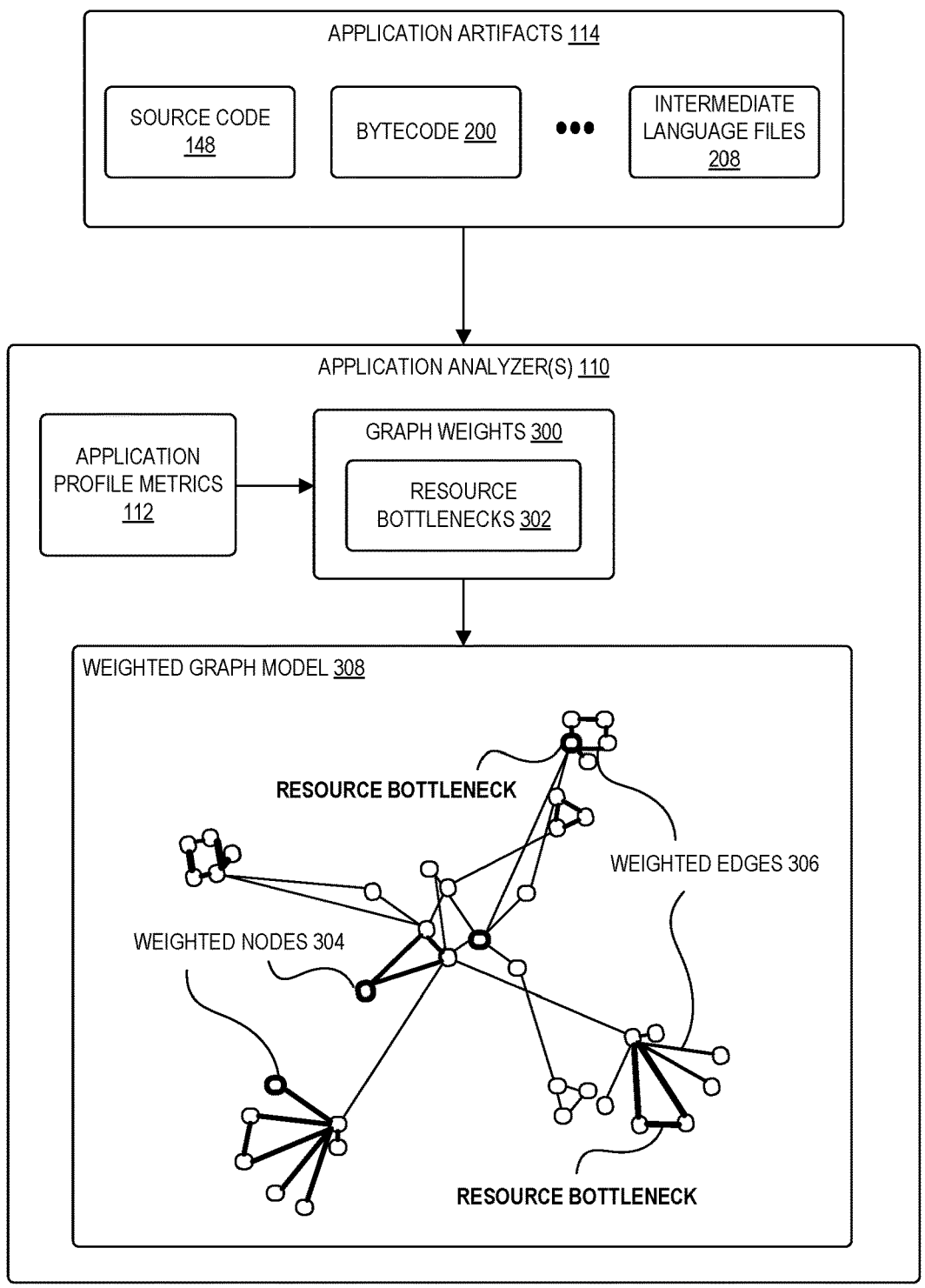
FIG. 3 is a block diagram illustrating the application of weights derived from application profile metrics to a graph model to obtain a weighted graph model representation of a monolithic software application according to some embodiments.

As shown in FIG. 3, the application analyzer(s) 110 use some or all of the generated application profiling metrics 112 to generate a set of graph weights 300, which may include one or more resource bottlenecks 302. In some embodiments, the graph weights 300 represent a normalized representation of the application profiling metrics 112 for some or all of the nodes and/or edges in the graph model 116. For example, one node in the graph model 116 might represent an amount of CPU usage by a particular group. The application analyzer(s) 110 can generate a weight for the node by normalizing a plurality of values contained in the application profiling metrics 112 associated with the particular group (e.g., runtime profiling metrics) and aggregating the normalized value to obtain a weight value for the node. In another example, one edge in the graph model 116 might represent a dependency relationship identified between two particular classes used to implement a software application. The application analyzer(s) 110 can generate a weight for the edge by normalizing a plurality of values contained in the application profiling metrics 112 associated with the relationship between the two classes (e.g., runtime profiling metrics, taint analysis metrics, pointer analysis metrics, etc.) and aggregating the normalized value to obtain a weight value for the edge. The collection of graph weights 300 can thus contain a set of weights associated with some or all of the nodes and/or edges in the graph model 116 when, once applied to the graph model 116, result in weighted nodes 304 and/or weighted edges 306 and a weighted graph model 308 (FIG. 3). In some embodiments, the weighted graph model 308 may be displayed in a GUI with an indication of a weight applied to one or more of the nodes and/or edges, for example by using line weighting (darker and/or thicker lines used for heavier weights), displaying numerical weight values associated with each node and/or edge, and/or using other visualizations.

In some embodiments, a weighted node 304 and/or weighted edge 306 may represent a resource bottleneck 302, where the resource bottlenecks 302 may be determined by comparison with one or more thresholds. For example, one node in the weighted graph model 308 might represent an application profile metric, such as an amount of memory usage by an application component. The amount of memory usage by the application component may be compared with a threshold and, if the amount of memory usage by the application component exceeds the threshold, then the application component may be identified as a resource bottleneck 302. For example, an application might have multiple classes that upload information to a network, and one of the classes might use a large amount of memory (e.g., 5 GB). If a threshold associated with memory usage is 2 GB, then the class that uses 5 GB of memory may represent a resource bottleneck. In another example, one edge in the weighted graph model 308 might represent an application profile metric, such as an amount of network bandwidth usage by two dependent application components. The amount of network bandwidth usage by the dependent application components may be compared with a threshold and, if the amount of memory usage by the dependent application components exceeds the threshold, then the dependent application components may be identified as a resource bottleneck 302.

In various embodiments, the threshold used to determine whether an application component (or a set of application components) represents a resource bottleneck 302 may vary based on the type of computing resource involved. In some embodiments, values for the thresholds may be derived from information such as a service-level agreement (SLA) that specifies performance characteristics. In some embodiments, values for the thresholds may be derived from constraints associated with resources to which the application component(s) might be migrated (e.g., instance size limits, database rate limits, computation completion time limits, limits associated with how quickly a computation can begin, which may be referred to as "cold start" limits, FLoating-Point Operations Per Second (FLOPS) limits, etc.). For example, in the memory usage example discussed in the preceding paragraph, the 2 GB threshold may be derived from a memory usage constraint associated with the provider network 100. In some embodiments, the resources to which the application component(s) might be migrated can be specified by the user, or identified automatically based on an analysis of the application's current deployment. For example, in some embodiments AWS Compute Optimizer may be used to identify candidate deployment resources.

In some embodiments, the bottlenecks 302 may be indicated on the weighted graph model 308. For example, the weighted nodes 304 and/or the weighted edges 306 on the weighted graph model 308 where bottlenecks occur may be identified with labels (e.g., "RESOURCE BOTTLENECK") as shown in FIG. 3. In some embodiments, the labels may include additional information, such as an identification of the computing resource(s) affected by the bottleneck 302 and a description of the amount of usage of the affected computing resource(s). For example, a label may indicate that an identified group consumes a stated amount of processor core, or that an identified package consumes a stated amount of memory, etc.

In some embodiments, the additional information may be displayed on the weighted graph model 308 adjacent the label(s), such as below the label (or in any other suitable location). In other embodiments, the additional information may be hidden from view and only displayed in response to user input, such as from a pointing device. For example, if a cursor or pointer (e.g., controlled by touchpad, mouse, or other pointing device) is used to select a particular label (or a node or an edge), such as by hovering over or clicking on the particular label (or node or edge), the additional information may then be displayed adjacent the particular label (or node or edge), such as in a popup window or bubble.

In some embodiments, color coding may be used to indicate different types of bottlenecks 302 on the weighted graph model 308. For example, bottlenecks 302 caused by CPU usage may be indicated by a first color, where the weighted node(s) 304 and/or the weighted edge(s) 306 affected by the CPU usage bottlenecks 302 are represented by circles and lines, respectively, that are the first color. Similarly, bottlenecks 302 caused by memory usage may be indicated by a second color that is different from the first color, while bottlenecks 302 caused by network bandwidth usage may be indicated by a third color that is different from the first and second colors, etc.

In some embodiments, a web-based console or standalone application GUI can display a graphical representation of the weighted graph model 308. For example, at circle "8" in FIG. 1, the modernization agent 130 transmits the weighted graph model 308 to the computing device(s) 106 for display to the user 104 in a GUI on a display. In some embodiments, information contained in, or derived from, the weighted graph model 308 may be displayed in a GUI on a display in a format different from the graph format shown in FIG. 3. For example, information related to the application components and the dependency relationships may be presented in a GUI on a display as a list, a table, a chart, or in any other format.

With reference to FIG. 1, in some embodiments, at circle "9," the application analyzer 110 generates the decomposition results 140 based on the generated and analyzed graph model(s) 116 and/or based on the weighted graph model 308. As indicated above, in some embodiments, the decomposition results 140 may be stored as machine-readable data that can be used by other modernization services or tools, e.g., to display results information about the proposed refactoring candidates and/or to automatically perform various refactoring operations. The results information can include an identification of the identified subunits of the application, information about each of the subunits (e.g., derived from associated metrics or other information), refactoring suggestions, among other possible information. In some embodiments, the decomposition results 140 can be used to generate various GUIs displayed to a user via the modernization agent 130, the application modernization service 102, or both. In some embodiments, for example, the decomposition results 140 can be used to generate a list of refactoring suggestions to be presented to the user in a GUI on a display. For example, the list of refactoring suggestions may be presented in a GUI in conjunction with the graph model 116 and/or the weighted graph model 308.

In some embodiments, the decomposition results 140 and/or refactoring suggestions may be based on, or driven by, the resource bottlenecks 302 identified in the weighted graph model 308. For example, a refactoring suggestion may be based on breaking an identified resource bottleneck 302 out into one or more microservices that would result in application profiling metrics associated with the microservices falling below the threshold associated with the identified resource bottleneck 302. In some embodiments, refactoring suggestions may be limited by the constraint that any breaking out of a resource into one or more microservices should not create any new resource bottlenecks.

In some embodiments, binary-augmented refactoring processes can be used to help users automatically refactor software applications based on identified subunits. For example, an analysis of only the source code associated with an application might miss various build-time components and other components associated with frameworks or third-party tools. A framework or third-party tool, for example, might perform code generation or modify the code based on annotations at build time that are not directly evident in the source code. In some embodiments, the application modernization service 102 performs a two-phase application analysis process, including an analysis of the source code and an analysis of associated bytecode or other artifacts to determine how to refactor an application's implementation based on a recommended application decomposition. In some embodiments, the application modernization service 102 then reconciles or merges graphs generated by the various analyses by identifying common nodes and unique nodes and overlaying the graphs on one another. The resulting hybrid model, for example, identifies relationships identified using both analysis processes and can provide a more complete representation of an application for automatic refactoring purposes.

Figure 4:
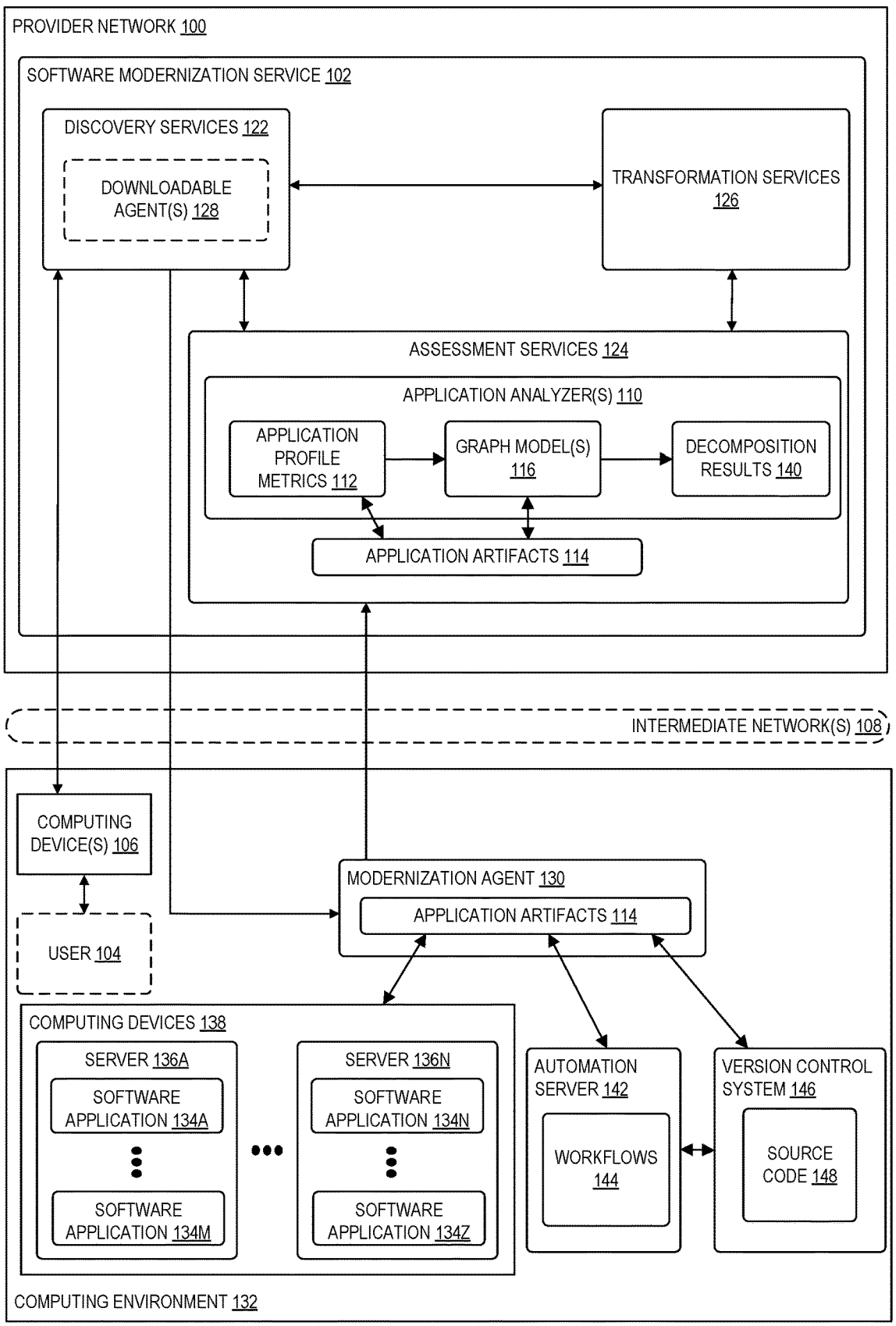
FIG. 4 is a block diagram illustrating a service-oriented environment for detection, presentation, and resolution of bottlenecks to decompose monolithic software applications as part of software modernization processes according to some embodiments.

FIG. 4 illustrates a service-oriented environment for detection, presentation, and resolution of bottlenecks to decompose monolithic software applications as part of software modernization processes according to some embodiments. Compared to the environment illustrated in FIG. 1, for example, the application analyzers 110 in the environment of FIG. 4 are provided as services of the assessment service 124 of the cloud provider network 100. In this example, the modernization agent 130 can be used to collect the application artifacts 114 and upload the application artifacts 114 to the assessment service 124. In some embodiments, the assessment service 124 can then perform some or all of the processes relating to the application profile metrics 112, the graph model 116, and the decomposition results 140 using computing resources (e.g., computing resources, database resources, etc.) of the cloud provider network 100, thereby taking advantage of the performance and scalability of a cloud provider network.

Figure 5:
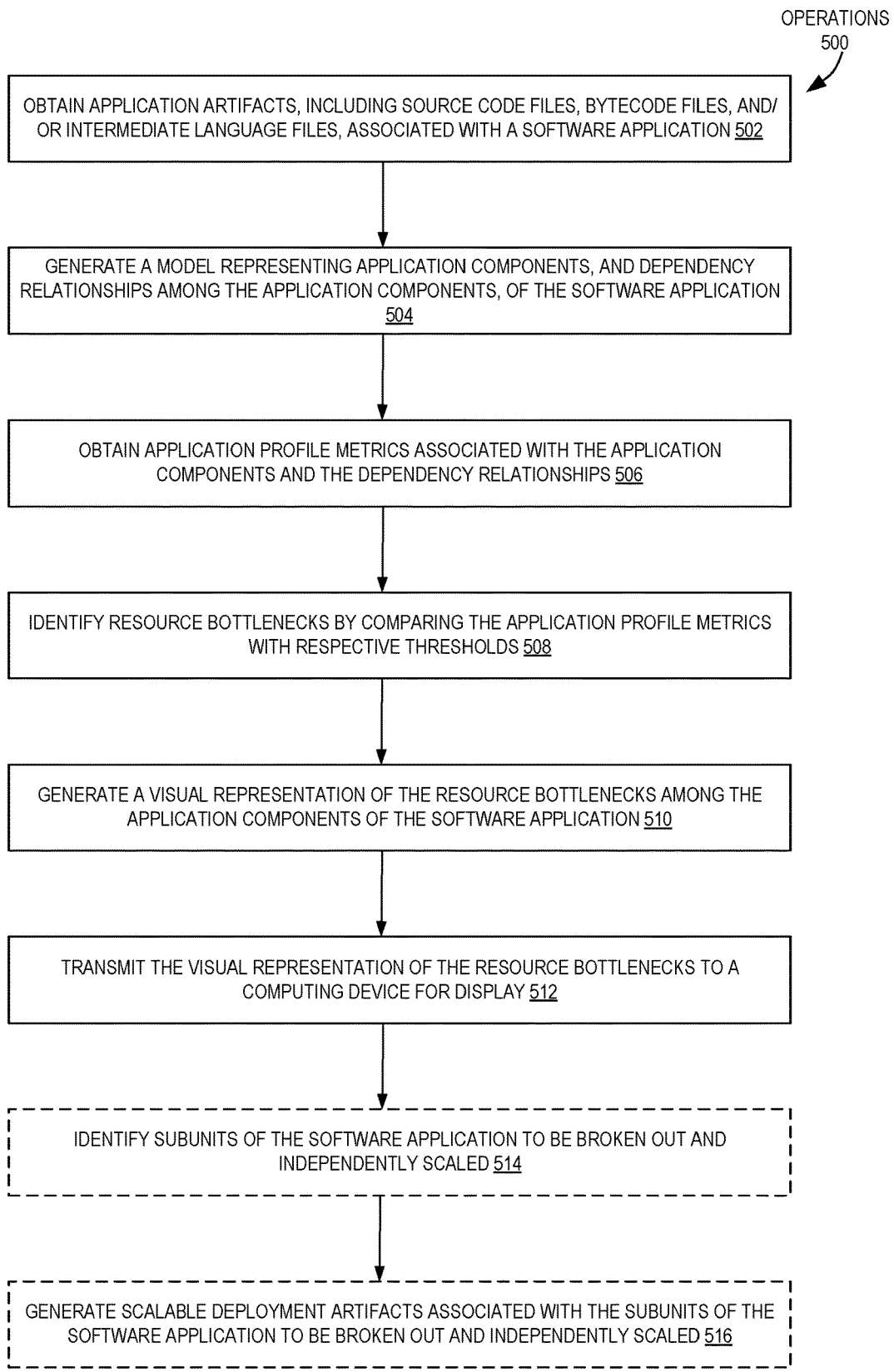
FIG. 5 is a flow diagram illustrating operations of a method for detection, presentation, and resolution of bottlenecks to decompose monolithic software applications as part of software modernization processes according to some embodiments.

FIG. 5 is a flow diagram illustrating operations of a method for detection, presentation, and resolution of bottlenecks to decompose monolithic software applications as part of software modernization processes according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a software modernization system of the other figures.

The operations 500 include, at block 502, obtaining application artifacts, including source code files, bytecode files, and/or intermediate language files, associated with a software application. For example, in some embodiments the modernization agent 130 (and/or another application running in the user computing environment 132) performs some or all of the application inventory and monitoring metrics collection operations 120, as described above with reference to FIGS. 1 and 2. In some embodiments, the application artifacts 114 may include, for example and without limitation, source code or binary executable file information identifying JAR files, DLL files, process identifiers, etc., and/or dynamic runtime information including, e.g., process identifiers, runtime artifacts such as binary executables, JAR files, DLL files, etc.

The operations 500 further include, at block 504, generating a model representing application components, and dependency relationships among the application components, of the software application. For example, in some embodiments the application analyzer(s) 110 generate the graph model 116 representing identified application components and dependency relationships among application components, as described above with reference to FIGS. 1 and 2.

The operations 500 further include, at block 506, obtaining application profile metrics associated with the application components and the dependency relationships. For example, in some embodiments the application profile metrics include at least one of: a runtime profiling metric representative of at least one of: an amount of resources used to process program calls between application components (e.g., CPU usage, memory usage, network bandwidth usage, storage bandwidth usage, number of file handles, number of open TCP handles/connections, level of concurrency, for example by number of threads, or any custom metric), a cardinality of program calls between application components, or a latency of program calls between application components; a taint analysis metric representative of sources of user input into the software application and associated data flows through the software application; a pointer analysis metric representative of application components that refer to a same shared object in memory; a dynamic reference metric representative of application components that refer to a same runtime instance of a data object; or a source code repository metric representative of information associated with source code file statistics relative to a version control system.

The operations 500 further include, at block 508, identifying resource bottlenecks by comparing the application profile metrics with respective thresholds. For example, in some embodiments the application profile metrics associated with the application components and the dependency relationships may be compared with respective thresholds and, where a given application profile metric exceeds the respective threshold, it may be determined that the application component or the dependency relationship corresponding to the application profile metric comprises a resource bottleneck.

The operations 500 further include, at block 510, generating a visual representation of bottlenecks among the application components of the software application. For example, in some embodiments the application analyzer(s) 110 identifies bottlenecks by applying the resource bottlenecks to the graph model 116 to obtain the weighted graph model 302, which provides a visual representation of the bottlenecks, as described above with reference to FIGS. 1 and 2. In some embodiments, bottleneck information can be presented (e.g., displayed on a display) at a node level, and/or at one or more aggregation levels, such as by class, by group, by package, by namespace, etc.

The operations 500 further include, at block 512, transmitting the visual representation of the bottlenecks to a computing device for display. For example, in some embodiments the modernization agent 130 transmits the weighted graph model 308 to the computing device(s) 106 for display to the user 104 in a GUI on a display, as described above with reference to FIGS. 1 and 3.

In some embodiments, the operations 500 may further include, at block 514, identifying subunits of the software application to be broken out and independently scaled. For example, in some embodiments the application analyzer(s) 110 generates the decomposition results 140 based on the generated and analyzed graph model(s) 116 and/or based on the weighted graph model 308, as described above with reference to FIGS. 1 and 3.

In some embodiments, the operations 500 may further include, at block 516, generating scalable deployment artifacts associated with the subunits of the software application to be broken out and independently scaled. For example, a CPU-usage bottleneck associated with a particular API may be identified at block 508. That particular API may thus be identified for breaking out. A container of that particular API, with its dependencies, may then be generated, and a cloudformation template may be generated with the deployment artifacts with autoscaling configuration according to the customer's choice, such as, for example, 100 container instances. In another example, if a bottleneck identified at block 508 is at the operating system (OS) level, then it can inform the choice of breakdown, such as whether the bottleneck should be broken out and independently scaled using containers or VMs, or a ratio of containers per VM as well as a number of VMs. For example, attributes such as file handles and a number of open sockets are OS limits enforced at either the kernel that many containers can share or in the container base image needed for each container. If the limit applies to the container base image, then a new container may be needed to scale out. But, if the limit applies to the shared kernel that the containers run on, then a new VM (proxy for kernel) may be needed.

Figure 6:
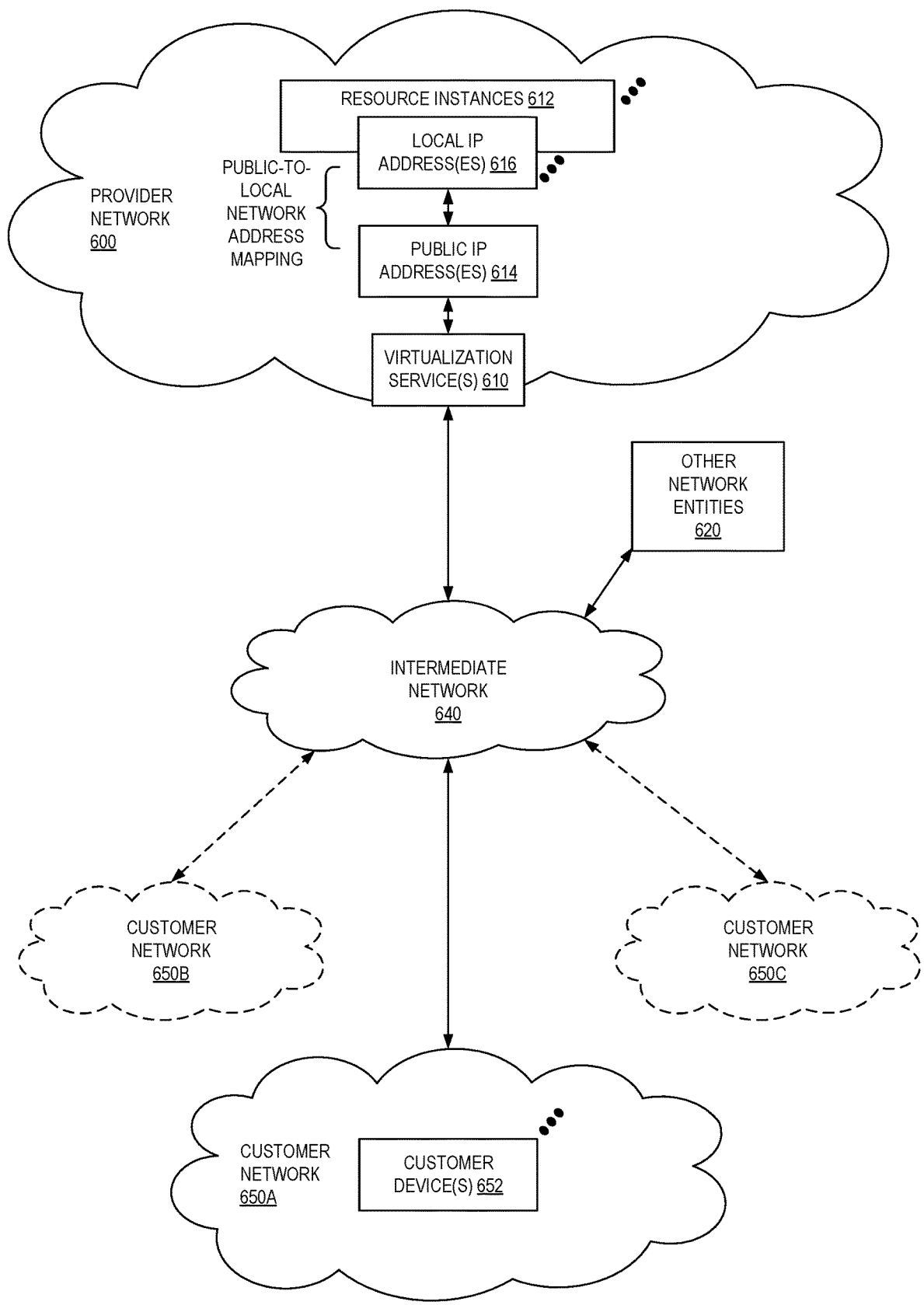
FIG. 6 is a block diagram illustrating an example provider network environment according to some embodiments.

FIG. 6 illustrates an example provider network (or "service provider system") environment according to some embodiments. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some embodiments, the provider network 600 can also provide public IP addresses 614 and/or public IP address ranges (e.g., Internet Protocol version 4 (IPv4) or Internet Protocol version 6 (IPv6) addresses) that customers can obtain from the provider network 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
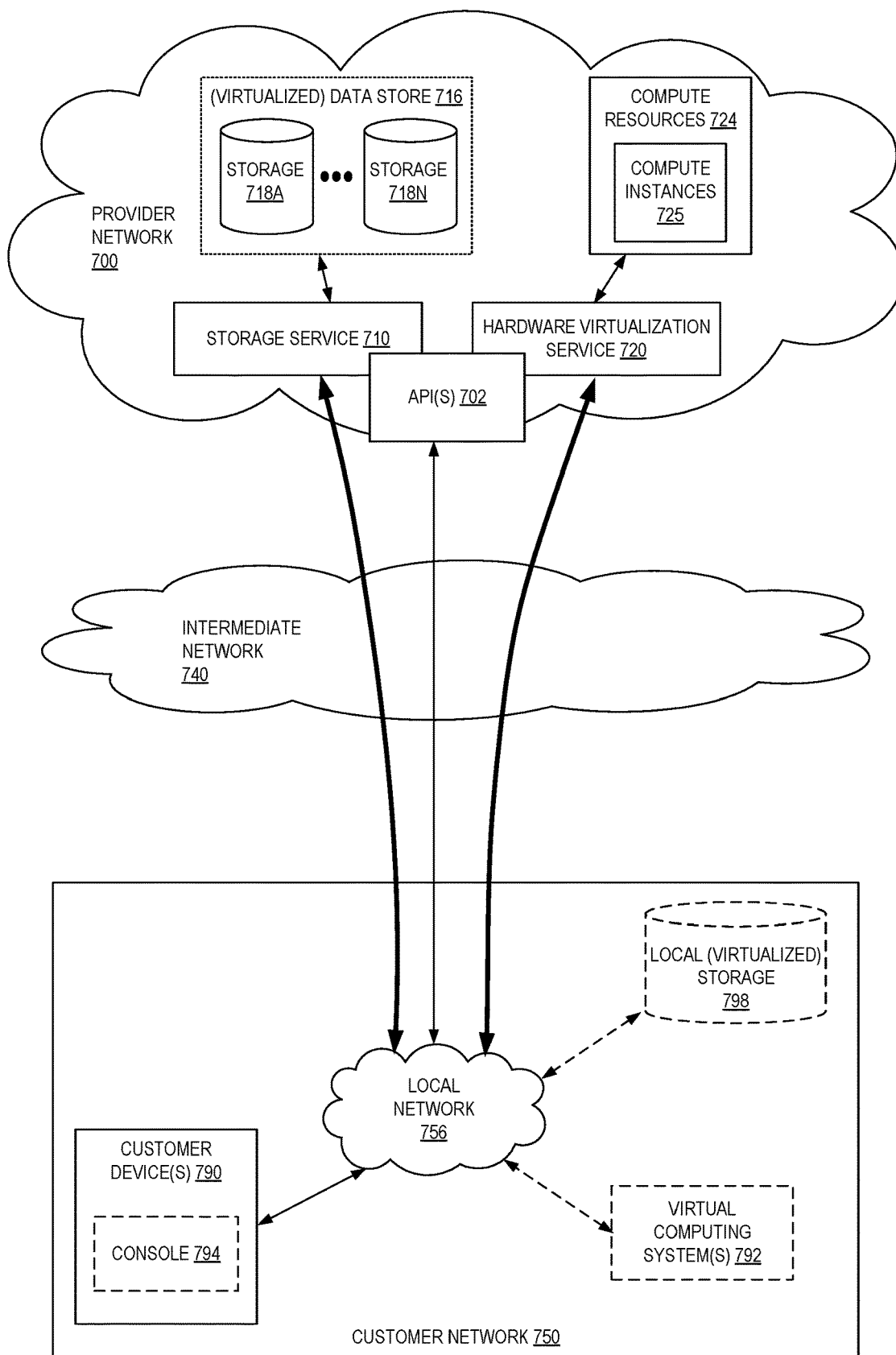
FIG. 7 is a block diagram illustrating an example provider network that provides a storage service and a hardware virtualization service to customers according to some embodiments.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some embodiments, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some embodiments, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some embodiments, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Illustrative Systems

Figure 8:
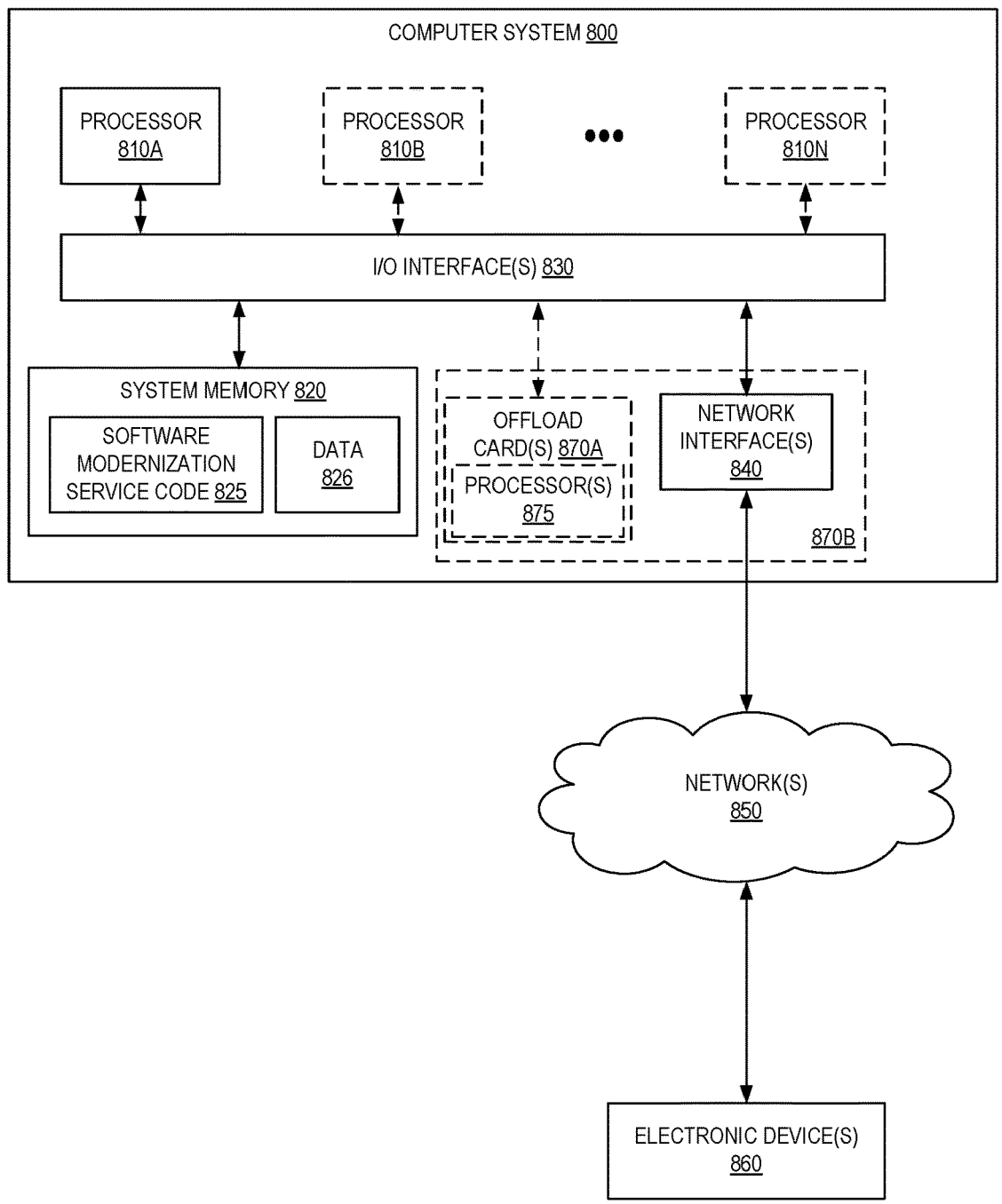
FIG. 8 is a block diagram illustrating an example computer system that can be used in some embodiments.

In some embodiments, a system that implements a portion or all of the techniques described herein can include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 can include one computing device or any number of computing devices configured to work together as a single computer system 800.

In various embodiments, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various embodiments, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various embodiments, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as software modernization service code 825 (e.g., executable to implement, in whole or in part, the software modernization service 102) and data 826.

In some embodiments, the I/O interface 830 can be configured to coordinate I/O traffic between the processor 810, the system memory 820, and any peripheral devices in the device, including the network interface 840 and/or other peripheral interfaces (not shown). In some embodiments, the I/O interface 830 can perform any necessary protocol, timing, or other data transformations to convert data signals from one component (e.g., the system memory 820) into a format suitable for use by another component (e.g., the processor 810). In some embodiments, the I/O interface 830 can include support for devices attached through various types of peripheral buses, such as a variant of the Peripheral Component Interconnect (PCI) bus standard or the Universal Serial Bus (USB) standard, for example. In some embodiments, the function of the I/O interface 830 can be split into two or more separate components, such as a north bridge and a south bridge, for example. Also, in some embodiments, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various embodiments, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations can, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and can not coordinate with (or service) any separate hypervisor.

In some embodiments, the system memory 820 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Figure 9:
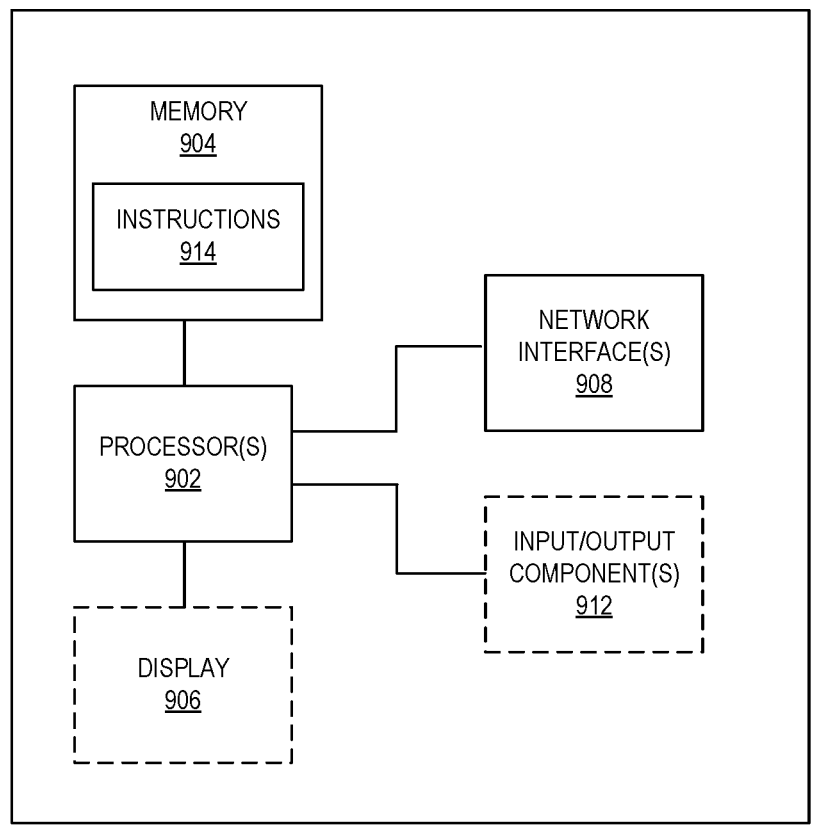
FIG. 9 is a block diagram illustrating a logical arrangement of a set of general components of an example computing device that can be used in some embodiments.

FIG. 9 illustrates a logical arrangement of a set of general components of an example computing device 900, such as the computing device 106, etc. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (e.g., instructions 914) and/or data, and a set of one or more wired or wireless network interfaces 908 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 914) for execution on the set of one or more processors 902 of that electronic device. One or more parts of various embodiments may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some embodiments include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and use a microphone, camera, sensor, etc., such that a user can control the device without having to be in physical contact with the device.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C # or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   receiving input representing a request to identify resource bottlenecks of a software application, the resource bottlenecks representing application components, or sets of application components, of the software application that are associated with high resource usage, wherein the application components are to be migrated from a user computing environment to a cloud provider network;
   obtaining application artifacts, including at least one of source code files, bytecode files, or intermediate language files, associated with the software application;
   generating, based at least in part on the application artifacts associated with the software application, output representing a graph model including:
   a plurality of nodes, wherein individual nodes represent different ones of the of the application components; and
   a plurality of edges, wherein individual edges represent a dependency relationship between two application components of the application components;
   obtaining application profile metrics associated with the application components and the dependency relationships;
   deriving values for predefined thresholds from predefined constraints associated with computing resources in the cloud provider network to which the application components are to be migrated;
   identifying the resource bottlenecks among the application components and the dependency relationships by comparing the application profile metrics with respective ones of the predefined thresholds and determining that at least a subset of the application components and the dependency relationships exceed the respective ones of the predefined thresholds;

generating output representing a weighted graph model including the resource bottlenecks by applying the resource bottlenecks to the graph model;

generating output representing labels for the weighted graph model, the labels identifying computing resources affected by the resource bottlenecks and indicating that an identified group consumes a stated amount of the computing resources; and transmitting the weighted graph model to a computing device for display.

2. The computer-implemented method of claim 1, the labels further identifying nodes from among the nodes corresponding to the resource bottlenecks and/or edges from among the edges corresponding to the resource bottlenecks.

3. The computer-implemented method of claim 1, further comprising generating output representing color coding indicating different types of the resource bottlenecks, a first type of the different types of the resource bottlenecks corresponding to a first color, and a second type of the different types of the resource bottlenecks corresponding to a second color different from the first color.

4. A computer-implemented method comprising:

obtaining application artifacts, including at least one of source code files, bytecode files, or intermediate language files, associated with a software application;

generating, based at least in part on the application artifacts associated with the software application, output representing a graph model representing application components of the software application and dependency relationships among the application components of the software application, wherein the application components are to be migrated from a user computing environment to a cloud provider network;

obtaining application profile metrics associated with the application components and the dependency relationships;

deriving values for predefined thresholds from predefined constraints associated with computing resources in the cloud provider network to which the application components are to be migrated;

identifying resource bottlenecks among the application components and the dependency relationships by comparing the application profile metrics with respective ones of the predefined thresholds and determining that at least a subset of the application components and the dependency relationships exceed the respective ones of the predefined thresholds;

generating output representing labels for the weighted graph model, the labels identifying computing resources affected by the resource bottlenecks and indicating that an identified group consumes a stated amount of the computing resources; and transmitting data representing the weighted graph model to a computing device.

5. The computer-implemented method of claim 4, the labels further identifying nodes from among the nodes corresponding to the resource bottlenecks and/or edges from among the edges corresponding to the resource bottlenecks.

6. The computer-implemented method of claim 4, further comprising generating output representing color coding indicating different types of the resource bottlenecks, a first type of the different types of the resource bottlenecks corresponding to a first color, and a second type of the different types of the resource bottlenecks corresponding to a second color different from the first color.

7. The computer-implemented method of claim 4, the application profile metrics comprising a runtime profiling metric representative of at least one of CPU (Central Processing Unit) usage, memory usage, network bandwidth usage, storage bandwidth usage, a number of file handles, a number of open TCP (Transmission Control Protocol) handles or connections, a level of concurrency, a number of threads, or a custom metric.

8. The computer-implemented method of claim 4, the predefined constraints comprising at least one of instance size limits or database rate limits.

9. The computer-implemented method of claim 4, further comprising receiving input specifying the computing resources to which the application components are to be migrated.

10. The computer-implemented method of claim 4, further comprising identifying the computing resources to which the application components are to be migrated based on an analysis of a current deployment of the software application.

11. The computer-implemented method of claim 4, wherein the application components are to be migrated from a user computing environment to a cloud provider network, the method further comprising:

receiving, by a modernization service of the cloud provider network, input representing a request to identify subunits of the software application; and sending, to a modernization agent of the user computing environment, data representing instructions to analyze the software application, the instructions causing the modernization agent to perform at least one of: obtaining the application artifacts associated with the software application, generating the output representing the graph model, obtaining the application profile metrics, identifying the resource bottlenecks, or generating the output representing the weighted graph model.

12. The computer-implemented method of claim 4, the application artifacts being obtained by a modernization service of a cloud provider network, and computing resources provisioned by the cloud provider network performing at least one of: generating the output representing the graph model, obtaining the application profile metrics, identifying the resource bottlenecks, or generating the output representing the weighted graph model.

13. A system comprising:

a first one or more electronic devices implementing a modernization service in a cloud provider network, the modernization service including instructions that, upon execution, cause the modernization service to:

obtain application artifacts, including at least one of source code files, bytecode files, or intermediate language files, associated with a software application;

generate, based at least in part on the application artifacts associated with the software application, output representing a graph model representing application components of the software application and dependency relationships among the application components of the software application, wherein the application components are to be migrated from a user computing environment to a cloud provider network;

obtain application profile metrics associated with the application components and the dependency relationships;

derive values for predefined thresholds from predefined constraints associated with computing resources in the cloud provider network to which the application components are to be migrated;

identify resource bottlenecks among the application components and the dependency relationships by comparing the application profile metrics with respective ones of the predefined thresholds and determining that at least a subset of the application components and the dependency relationships exceed the respective ones of the predefined thresholds;

generate output representing a weighted graph model including the resource bottlenecks by applying the resource bottlenecks to the graph model;

generate output representing labels for the weighted graph model, the labels identifying computing resources affected by the resource bottlenecks and indicating that an identified group consumes a stated amount of the computing resources; and transmit data representing the weighted graph model to a computing device; and a second one or more electronic devices implementing a modernization agent, the modernization agent including instructions that upon execution cause the modernization agent to:

obtain the application artifacts associated with the software application from a user's computing environment; and send the application artifacts to the modernization service.

14. The system of claim 13, the labels further identifying nodes from among the nodes corresponding to the resource bottlenecks and/or edges from among the edges corresponding to the resource bottlenecks.

15. The system of claim 13, the modernization service including further instructions that, upon execution, further cause the modernization service to generate output representing color coding indicating different types of the resource bottlenecks, a first type of the different types of the resource bottlenecks corresponding to a first color, and a second type of the different types of the resource bottlenecks corresponding to a second color different from the first color.

16. The system of claim 13, the application profile metrics comprising a runtime profiling metric representative of at least one of CPU (Central Processing Unit) usage, memory usage, network bandwidth usage, storage bandwidth usage, a number of file handles, a number of open TCP (Transmission Control Protocol) handles or connections, a level of concurrency, a number of threads, or a custom metric.

17. The system of claim 13, the predefined constraints comprising at least one of instance size limits or database rate limits.

18. The system of claim 13, the modernization service including further instructions that, upon execution, further cause the modernization service to identify the computing resources to which the application components are to be migrated based on an analysis of a current deployment of the software application.

19. The system of claim 13, the modernization service including further instructions that, upon execution, further cause the modernization service to receive input specifying the computing resources to which the application components are to be migrated.

20. The system of claim 13, the modernization service including further instructions that, upon execution, further cause the modernization service to:

receive input representing a request to identify subunits of the software application; and send, to a modernization agent of the user computing environment, data representing instructions to analyze the software application, the instructions causing the modernization agent to perform at least one of: obtaining the application artifacts associated with the software application, generating the output representing the graph model, obtaining the application profile metrics, identifying the resource bottlenecks, or generating the output representing the weighted graph model.

* * * * *